United States Patent [19]

Horrion

[11] Patent Number: 5,589,544
[45] Date of Patent: Dec. 31, 1996

[54] SOFT THERMOPLASTIC ELASTOMERS HAVING IMPROVED RESISTANCE TO OIL SWELL AND COMPRESSION SET

[75] Inventor: Jacques Horrion, Tilff, Belgium

[73] Assignee: Advanced Elastomer Systems, L.P., Akron, Ohio

[21] Appl. No.: 440,615

[22] Filed: May 15, 1995

[30] Foreign Application Priority Data

Jul. 6, 1994 [EP] European Pat. Off. .............. 94110498

[51] Int. Cl.⁶ ...................................... C08F 8/00
[52] U.S. Cl. .................. 525/176; 525/179; 525/183; 525/184; 525/189; 525/199; 525/221; 525/222; 525/227; 525/228; 525/230; 525/238; 525/240; 525/241; 525/322; 525/324; 525/474; 525/479; 525/535; 525/537
[58] Field of Search ..................... 525/183, 184, 525/179, 176, 189, 199, 221, 222, 227, 228, 230, 238, 240, 241, 322, 324, 474, 479, 535, 537

[56] References Cited

U.S. PATENT DOCUMENTS

| | | | |
|---|---|---|---|
| 3,037,954 | 6/1962 | Gessler et al. | 260/29.8 |
| 4,160,790 | 7/1979 | Mason et al. | 525/179 |
| 4,346,194 | 8/1982 | Roura | 525/66 |
| 4,591,615 | 5/1986 | Aldred et al. | 525/179 |
| 4,996,264 | 2/1991 | Aonuma et al. | 525/179 |
| 5,051,478 | 9/1991 | Puydak et al. | 525/195 |
| 5,070,145 | 12/1991 | Guerdoux | 525/179 |
| 5,091,478 | 2/1992 | Saltman | 525/183 |
| 5,281,665 | 1/1994 | Fukui et al. | 525/240 |
| 5,371,143 | 12/1994 | Novak et al. | 525/89 |
| 5,376,712 | 12/1994 | Nakajima | 525/183 |
| 5,420,206 | 5/1995 | Mason et al. | 525/183 |
| 5,523,350 | 6/1996 | Venkataswamy et al. | 525/109 |

FOREIGN PATENT DOCUMENTS

| | | | |
|---|---|---|---|
| 0234468 | 9/1987 | European Pat. Off. . | |
| 356978 | 3/1990 | European Pat. Off. | 525/183 |
| 0506465 | 9/1992 | European Pat. Off. . | |
| 93-14155 | 7/1993 | WIPO . | |

*Primary Examiner*—Mark D. Sweet
*Attorney, Agent, or Firm*—William A. Skinner

[57] ABSTRACT

The invention relates to a soft thermoplastic elastomeric composition having improved resistance to oil swell and compression set comprising a blend of an engineering thermoplastic resin, a cured rubber concentrate and optionally a compatibilizer and a method for its preparation. The invention further relates to the cured rubber concentrate, a method for its preparation and the use thereof.

9 Claims, No Drawings

SOFT THERMOPLASTIC ELASTOMERS HAVING IMPROVED RESISTANCE TO OIL SWELL AND COMPRESSION SET

BACKGROUND OF THE INVENTION

1. Field of the Invention

This invention relates to soft thermoplastic elastomers (TPE) having improved resistance to oil swell and excellent resistance to compression set, a method for their preparation and their use. Furthermore, the present invention relates to cured rubber concentrates (CRC) which are used for the preparation of said thermoplastic elastomers.

A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic polyolefin with an elastomeric composition in a way such that the elastomer is intimately and uniformly dispersed as a discrete particulate phase within a continuous phase of the thermoplastic. Early work with vulcanized compositions is found in US-A-3 037 954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisobutene in an uncured matrix of thermoplastic polymer such as polypropylene.

U.S. Pat. No. 4,160,790 discloses synergistic improvement of nylon-6 or nylon-66 impact resistance by blending, in the melt, with minor proportions of both an ethylene/acrylic acid copolymer and an ethylene/ethyl acrylate copolymer.

U.S. Pat No. 4,996,264 discloses a thermoplastic and elastomeric composition comprising a polyamide resin and a rubber component, wherein the rubber component is dispersed in the form of crosslinked particles in the polyamide resin. The rubber component is composed of a nitrile-group containing rubber and an acrylic rubber. These compositions have fracture resistance, such as heat resistance, ozone resistance and gasoline resistance.

U.S. Pat. No 5,051,478 discloses a dynamically vulcanized composition which comprises a polyolefin resin, an elastomer, and an ethylene copolymer resin such as a copolymer of ethylene and vinyl acetate or an alkyl acrylate. A process for producing the dynamically vulcanized composition is also provided, which process includes the addition of the ethylene copolymer resin after the dynamic vulcanization step. The resulting composition comprises the ethylene copolymer resin predominantly in the polyolefin resin phase. The compositions have improved surface appearance and softness, but a bad resistance to oil swell.

However, thermoplastic elastomers based on ethylene acrylic rubber (EAR-Vamac) and engineering resins are almost impossible to prepare with the existing processing equipment. When polyamide (PA) is used, there is an important increase in torque and temperature when adding the curative which cannot be controlled while processing. When polyester or polyphenylene ether (PPO) or polycarbonate (PC) are used, there are side reactions between the conventional curatives recommended for the rubber and the plastic phase which do not produce a material which can be adequately injection moulded or extruded into a finished part. When the curative does not interact with the plastic phase, the properties are acceptable but it is impossible to achieve low compression set and oil resistance. Attempts have been made to overcome this problem and try to avoid these undesirable reactions between the plastic phase and the curative. For example, the introduction of the curative as a master batch in rubber did not show significant improvement in fabricability. The introduction of some rubber without cure site in place of the curable one to act as a barrier between the plastic phase and the curing rubber gave worse properties and did not improve the process.

Thus, it is an object of the present invention to provide soft thermoplastic elastomer materials which would give good resistance to oil swell and excellent resistance to compression set. Furthermore these materials should still have a high elongation and/or tensile strength at break.

SUMMARY OF THE INVENTION

The present invention relates to a thermoplastic elastomeric composition comprising a blend of (a) about 10 to about 40 parts by weight of an engineering thermoplastic resin and (b) about 90 to about 60 parts by weight of a cured rubber concentrate which is obtainable by mixing
  (i) about 10 to about 90% by weight, based on the weight of (i) plus (ii), of a curable elastomeric copolymer (rubber);
  (ii) about 90 to about 10% by weight, based on the weight of (i) plus (ii), of a polymeric carrier which is not miscible with the curable elastomeric copolymer as assessed by the presence of two different glass transition temperatures in the blend of (i) and (ii) and which carrier does not react with the curative used to vulcanize (i);
  (iii) about 0.1 to about 5 parts by weight, based on 100 parts by weight of (i) plus (ii) of a curing agent (curative) for the curable elastomeric copolymer; and
  (iv) optionally additives, under conditions of heat and shear in a melt mix at least until the maximum torque has been reached, (c) up to about 10 parts by weight of a compatibilizer.

Unexpectedly, these compositions have a good resistance to oil swell, improved impact strength at low temperatures and improved abrasion resistance, while maintaining the desirable properties of low compression set, high tear strength and good dynamic properties over a broad temperature range, i.e. about −40° to about 180° C.

DESCRIPTION OF THE PREFERRED EMBODIMENTS

Engineering thermoplastic resin

Suitable engineering thermoplastic resins in terms of the present invention are polar polymers and copolymers with a glass transition temperature (Tg) and/or melting point of above 100° C., preferably above 150° C. They are selected from polyamides, polyesters, polyimides, polyphenylene sulfide, polyphenylene sulfone, fluorinated polymers, styrene acrylonitrile copolymers, acrylonitrile-butadiene-styrene terpolymers, styrene maleic anhydride copolymer, polyphenylene ether and its blends with polystyrene, polycarbonates and blends thereof.

The amount of engineering thermoplastic resin found to provide useful compositions is generally from about 10 to about 40 parts by weight, more preferably about 15 to about 35 parts by weight and most preferably about 15 to about 30 parts by weight, based on the weight of the composition comprising (a), (b) and optionally (c).

Curable elastomeric copolymer (rubber)

The following different types of rubbers can be used in terms of the present invention:

1. The curable rubbers of the present invention are olefin/acrylic ester copolymer rubbers. Such rubbers can be copolymers produced by polymerizing at least one α-olefin with at least one $C_1$–$C_{18}$ alkyl (meth)acrylate and, optionally, a minor amount of an unsaturated functionalized monomer which can provide crosslinking sites. Such functionalized monomer can comprise acid, hydroxy, epoxy, isocyanate, amine, oxazoline, diene or other reactive groups. In the absence of such functionalized monomer, crosslinking sites can be generated, e.g. by partial hydrolysis of ester groups of the rubber. Suitable α-olefins for polymerization of such copolymer rubbers include ethylene, propylene, butene-1, isobutylene, pentenes, heptenes, octenes, and the like or mixtures thereof; $C_1$–$C_4$ α-olefins are preferred and ethylene is often most preferred. Suitable alkyl (meth)acrylates for copolymerizing with the alkene include methyl acrylate, ethyl acrylate, t-butyl acrylate, n-butyl acrylate, 2-ethylhexyl acrylate, methyl methacrylate, ethyl methacrylate, n-butyl methacrylate, and the like or a mixture thereof; $C_1$–$C_2$ alkyl (meth) acrylates are often preferred, and $C_1$–$C_4$ alkyl (meth)acrylates are most often preferred. In many cases a preferred olefin/acrylic ester copolymer rubber comprises unsaturated carboxylic acid monomer units, such as acid units, e.g. derived from (meth)acrylic acid or maleic acid, anhydride units, e.g. derived from maleic anhydride or partial ester units, e.g. derived from mono ethyl maleate. In many cases a preferred olefin/acrylic ester copolymer rubber is a terpolymer of ethylene, $C_1$–$C_4$ alkyl acrylate and an acidic monomer unit; more preferably such terpolymer comprises at least about 30 mole percent of ethylene, about 10 to about 69.5 mole percent mono ethyl maleate. In all cases it is preferred that the acrylate rubber be essentially non-crystalline and have a glass transition temperature (Tg) below room temperature, i.e. below about 20°.

2. Other suitable rubbers are acrylic rubbers. This acrylic rubber is a multi-component copolymer and prepared by polymerizing an alkyl acrylate and/or an alkoxy-substituted alkyl acrylate, a crosslinkable monomer, and optionally other ethylenically unsaturated compounds copolymerizable with the alkyl acrylate and/or the alkoxy-substituted alkyl acrylate and the crosslinkable monomer. There is no particular limitation with respect to the composition of the polymer.

The alkyl acrylate is one represented by the following general formula:

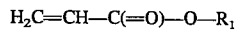

wherein $R_1$ is an alkyl group having about 1 to about 18 carbon atoms. Examples of the alkyl acrylate include methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Particularly preferable examples thereof include ethyl acrylate, n-propyl acrylate, n-butyl acrylate, n-pentyl acrylate, n-hexyl acrylate, 2-ethylhexyl acrylate and n-octyl acrylate.

The alkoxy-substituted alkyl acrylate is one represented by the following general formula:

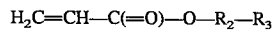

wherein $R_2$ is an alkylene group having about 1 to about 18 carbon atoms and R3 is an alkoxy group having about 1 to about 18 carbon atoms, and examples thereof include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate.

The crosslinkable monomer is a monomer which can make the copolymer prepared by copolymerization vulcanizable, and examples thereof include at least one compound selected from the group consisting of diene compounds, dihydrodicyclopentadienyl group-containing (meth)acrylates, epoxy group-containing ethylenically unsaturated compounds, active halogen-containing ethylenically unsaturated compounds, and carboxyl group-containing ethylenically unsaturated compounds.

In the above-described crosslinkable monomers, examples of the diene compound include non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl (meth)acrylate and dihydrodicyclopentadienyloxyethyl (meth)acrylate. Examples of the epoxy group-containing ethylenically unsaturated compound include allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxymethyl-5-norbornene. Specific examples of the carboxyl group-containing ethylenically unsaturated compound include acrylic acid, methacrylic acid, crotonic acid, 2-pentenoic acid, maleic acid, fumaric acid and itaconic acid.

The other ethylenically unsaturated compounds may be various compounds depending upon the necessity. Examples of the other ethylenically unsaturated compounds include methacrylates such as methylmethacrylate and octyl methacrylate; cyano-substituted alkyl (meth)acrylates such as 2-cyanoethyl acrylate, 3-cyanopropyl acrylate, and 4-cyanobutyl acrylate; amino-substituted alkyl (meth)acrylates such as diethylaminoethyl acrylate; fluorine-containing acrylates such as 1,1,1-trifluoroethyl acrylate; hydroxyl group-substituted alkyl (meth)acrylates such as hydroxyethyl acrylate; alkyl vinyl ketones such as methyl vinyl ketone; vinyl or allyl ethers such as vinyl ethyl ether and ally methyl ether; vinyl aromatic compounds such as styrene, α-methylstyrene, chlorostyrene ad vinyltoluene; vinylamides such as acrylamide, methacrylamide and N-methylolacrylamide; and ethylene, propylene, vinyl chloride, vinylidene chloride, vinyl fluoride, vinylidene fluoride, vinyl acetate, alkyl fumarate, etc.

3. Further suitable rubbers are nitrile rubbers. Examples of the nitrile group-containing rubber include a copolymer rubber comprising an ethylenically unsaturated nitrile compound and a conjugated diene and optionally a monomer copolymerizable with the ethylenically unsaturated nitrile compound and the conjugated diene. Further, the copolymer rubber may be one in which the conjugated diene units of the copolymer rubber are hydrogenated.

Specific examples of the ethylenically unsaturated nitrile compound include acrylonitrile, α-chloroacrylonitrile, α-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, 1,3-butadiene is particularly preferable. Preferred nitrile rubbers comprise polymers of 1,3-butadiene and about 10 to about 50 weight percent acrylonitrile. Commercially available nitrile rubbers suitable for the practice of the invention are described in *Rubber World Blue Book*, 1980 Edition, Materials and Compounding Ingredients for Rubber, pages 386–406.

Various compounds may be used as the monomer according to need, and examples thereof include alkyl acrylates such as methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, and n-octadecyl acrylate; alkoxy-substituted alkyl acrylates such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate; alkyl methacrylates such as methyl methacrylate and octyl methacrylate; alkyl vinyl ketones such as methyl vinyl ketone; vinyl or allyl ether such as vinyl ethyl ether and allyl methyl ether; vinyl aromatic compounds such as styrene, α-methylstyrene, chlorostyrene, and vinyltoluene; carboxyl group-containing compounds such as acrylic acid, methacrylic acid, crotonic acid, 2-pentenoic acid, maleic acid, fumaric acid, and itaconic acid; fluorine containing acrylates such as 1,1-dihydroperfluoroethyl (meth)acrylate, 1,1-dihydroperfluoropropyl (meth)acrylate, 1,1,5-trihydroperfluoropropyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate, and 1,1-dihydroperfluorodecyl (meth)acrylate; epoxy group-containing compounds such as allyl glycidyl ether, glycidyl methacrylate, and glycidyl acrylate; active halogen-containing compounds such as vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone, and 2-chloroacetoxymethyl-5-norbornene; hydroxyl group-containing compounds such as 1-hydroxypropyl (meth)acrylate, 2-hydroxypropyl (meth) acrylate, and hydroxyethyl (meth)acrylate; substituted amino group-containing monomers such as dimethylaminoethyl (meth)acrylate, diethylaminoethyl (meth)acrylate, and dibutylaminoethyl (meth)acrylate; vinylamides such as acrylamide methacrylamide, and N-methylolacrylamide; and ethylene, propylene, vinyl chloride, vinylidene chloride, alkyl fumarate, etc.

4. Silicone rubbers can also be employed as rubber in terms of the present invention.

5. Epichlorohydrin rubbers obtainable by ring-opening polymerization of epichlorohydrine and optionally in the presence of ethylene oxide or propylene oxide can also be used as curable rubber in terms of the present invention.

Depending on the desired properties of the final composition blends of any of the above curable rubbers can be employed, rather than a single curable rubber.

In preparing the compositions of the invention, the amount of curable rubber generally ranges from about 90 to about 60 parts by weight, more preferably about 85 to about 65 parts by weight and most preferably about 85 to about 70 parts by weight, based on the composition comprising (a), (b) and optionally (c).

Polymeric carrier

The carrier is defined as a polymer which does not react with the curatives of the curable rubber. It can be thermoplastic polymer or copolymer, elastomer or thermoplastic elastomer and may contain reactive groups which do neither react with the curatives used for the curable rubber nor with the functional groups of the curable rubber and which carrier can be cured while blending with the engineering thermoplastic resin. Furthermore, the carrier is not miscible with the curable elastomeric copolymer (rubber) as assessed by the presence of two different glass transition temperatures (Tg) in the blend of the curable elastomeric copolymer and the carrier. However, the selection of the carrier is dictated by its affinity for the curable rubber. If the two polymers are miscible, the resulting material will have a very high viscosity or will be a powder because the phase separation will be very difficult to achieve while the rubber is curing. If the two polymers are incompatible, i.e. the blend does still show two different glass transition temperatures which are about the same as the separate polymers before blending, the particle size of the cured rubber will be very important and the lack of interfacial adhesion between the two polymers will not give good properties in the final formulation. However, in the case of incompatible polymers, the addition of a suitable amount of one or more compatibilizers will solve the problem. The best carrier needs to have some compatibility/partial miscibility with the curable rubber so that the system is already (slightly) phase separated when the curatives are added and the interfacial adhesion after curing will be good enough to give the desired mechanical properties.

The carrier is compatible/partially miscible with the curable rubber if the glass transition temperatures of the blend before cure are significantly different compared to those of the separate polymers before blending.

The selection of the carrier is also dictated by the engineering resin. Sufficient compatibility is also needed for the same reason as above. Miscibility is acceptable but not desired because the carrier being homogeneously dispersed in the plastic phase will reduce its melting or glass transition temperature and consequently the maximum service temperature. In case the selection of a carrier compatible enough with the plastic phase is not possible, a compatibilizer will be needed.

The carrier can be selected from typical thermoplastic polymers or copolymers, elastomers or thermoplastic elastomers which are commonly known in the art and which fulfil the requirements mentioned above and explained below in more detail.

Compatibilizer

Blends between immiscible polymers have poor mechanical properties because the interactions between their components are too low. When stressed, microcracks occur in the weak interfaces which cause the blend to fail. In processing, in the majority of cases, delamination occurs between the components.

In solution to this problem is to add into the blend a third component, an interfacially active compatibilizer. The interfacial agent must be designed so that each segment or functionality group is compatible in one of the major phases and incompatible in the other. The compatibilizer can improve interfacial adhesion by connecting the phases through interactions. It acts as an emulsifier between the two polymers, like the sodium salt of a fatty acid between water and oil. An efficient compatibilizer has the same affinity for both blend components and has the capability to form a stable blend. Well known examples are summarized in the experimental part. In general up to about 10 weight parts compatibilizer, preferably about 1 to about 10 weight parts is sufficient to stabilize immiscible blends. In many industrial applications, both compatibilizer and impact modifier are required to produce multipolymer blends with a desirable balance of properties.

Suitable compatibilizers are known in the art, e.g. in Teyssie Ph., Fayt R., Jerome R., Makromoleculare Chemie, Macromolecular Symposium, 16., 91 (1988) and Gaylord N. G., Journal of Macromolecular Science Chemistry, A26 (8), 1211 (1989).

Additives

In addition to the engineering thermoplastic resin, cured rubber and polymeric carrier components, the compositions of the invention include curatives and may also include reinforcing and non-reinforcing fillers, plasticizers, antioxidants, stabilizers, rubber processing oil, extender oils, lubricants, antiblocking agents, antistatic agents, waxes, foaming agents, pigments, flame retardants and other processing aids known in the rubber compounding art.

The additives can be added during the preparation of the cured rubber concentrate or the preparation of the thermoplastic elastomeric composition or both, provided that the total amount of the additives does not exceed about 35% by weight, preferably about 25% by weight based on the total thermoplastic elastomeric composition comprising (a), (b), optionally (c) and said additives.

Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity based on the total rubber content may range from zero to a few hundred phr. However, processing oil need not be present, and in fact it may be totally replaced by a plasticizer for the composition. In other words, depending upon the properties desired in the thermoplastic elastomeric composition of the invention, the composition may be free of processing oil or it may contain a combination of processing oil and plasticizer.

Processing

According to the present invention first a cured rubber concentrate (CRC) is prepared which is subsequently blended with a thermoplastic engineering resin as mentioned above, optionally in the presence of a compatibilizer.

The cured rubber concentrate (b) is obtainable by a method comprising mixing (i) about 10 to about 90% by weight, based on the weight of (i) plus (ii), of a curable elastomeric copolymer (rubber);

(ii) about 90 to about 10% by weight, based on the weight of (i) plus (ii), of a polymeric carrier which is not miscible with the curable elastomeric copolymer as assessed by the presence of two different glass transition temperatures in the blend of (i) and (ii) and which carrier does not react with the curative used to vulcanize (i);

(iii) about 0.1 to 5 about parts by weight, based on 100 weight parts of (i) plus (ii) of a curing agent (curative) for the curable elastomeric copolymer; and (iv) optionally additives, under conditions of heat and shear in a melt mix at least until the maximum torque has been reached.

Said mixing is carried out at a temperature between about 20° C. and about 200° C. depending on the melting point or Tg of the polymeric carrier in an internal mixer or a single or twin screw extruder. The rubber is crosslinked by the process of dynamic vulcanization.

The term "dynamic vulcanization" means a vulcanization or curing process for a rubber contained in a composition, wherein the curable rubber is vulcanized under conditions of high shear at a temperature above the melting point of the rubber component. Dynamic vulcanization is effected by mixing the components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is fully cured, the compositions can be processed and reprocessed by conventional plastic processing techniques such as extrusion, injection molding and compression molding. Scrap or flashing can be salvaged and reprocessed.

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific olefinic rubber or combination of rubbers. These curatives include sulfur, sulfur donors, metal oxides, resin systems, peroxide-based systems and the like, both with and without accelerators and co-agents. Such cure systems are well known in the art and literature of vulcanization of elastomers.

The rubber is partially or fully vulcanized which means that the rubber component to be vulcanized has been cured to a state in which the elastomeric properties of the partially or fully crosslinked rubber are similar to those of the rubber in its conventional vulcanized state. The degree of cure can be described in terms of gel content or, conversely, extractable components. Alternatively the degree of cure may be expressed in terms of crosslink density. All of these descriptions are well known in the art, for example in U.S. Pat. No. 5,100,947 and 5,157,081.

Especially preferred as cured rubber are concentrates based on cured ethylene/acrylic ester terpolymers and ethylene/methylacrylate as carrier and furthermore concentrates based on cured ethylene/acrylic ester terpolymers and acrylic rubbers as carrier.

The cured rubber concentrates of the present invention as such can be used as oil resistant and silane crosslinkable material.

The thus obtained cured rubber concentrates are blended with one or more of the engineering thermoplastic resins mentioned above in a suitable mixer such as those mentioned above. Mixing takes place at a temperature which is about 20 to about 30° C. above the melting or glass transition temperature of the plastic phase (engineering thermoplastic resin). If desired further additives can be added at this stage. In case that the carrier is not compatible with the plastic phase a compatibilizer as mentioned above is added to the mixture. The addition of the various components may vary.

In a second step, the carrier can optionally be crosslinked while mixing with the engineering resin using suitable conventional curatives which are known to be unreactive with the engineering thermoplastic resin and which curative is different from the curative for curing the rubber.

After cooling and removing from the mixer, the composition can be compression-moulded, injection-moulded, blow-moulded or extruded and tested for its physical properties.

Particularly preferred is a blend of polyamides and a cured rubber concentrate based on cured ethylene/acrylic ester and ethylene methylacrylate or acrylic rubber as carrier.

The obtained thermoplastic elastomer materials are soft, i.e. they have a shore A hardness below about 95 and they have a good resistance to oil swell and excellent resistance to compression set. Furthermore these materials possess a high elongation and/or tensile strength at break. The blends of the present invention can be used as high heat and oil resistant thermoplastic elastomers.

The invention will be better understood by reference to the following examples which serve to illustrate but not to limit the present invention.

EXAMPLES

All amounts are in parts by weight unless otherwise stated.

1. Polymers employed a) Engineering thermoplastic resins: PA6™ refers to different polyamides 6 having different molecular weights and which are obtainable under the trade names indicated below; PBT refers to polybutyleneterephthalate

| PA6#1  | Capron 8200    | (Allied)          |
|--------|----------------|-------------------|
| PA6#2  | Ultramid B4    | (BASF)            |
| PA6#3  | Ultramid B3    | (BASF)            |
| PBT    | Celanex 2002   | (Hoechst-Celanese)|
| PA6,6#1| Ultramid A3    | (BASF)            |
| PA6,6#2| Ultramid A4    | (BASF)            |
| PA6#4  | Ultramid B35   | (BASF)            |
| PA6#5  | Ultramid KR4405| (BASF)            |
| PA6#6  | Ultramid B5    | (BASF)            | b) Polymeric carriers:

EMA: ethylene-methyl acrylate copolymer containing 72% ethylene and 28% methyl acrylate (Optema XS12-04; Exxon Chemical)

EMA20: ethylene - methyl acrylate copolymer containing 80% ethylene units and 20% methyl acrylate comonomer (Optema TC 140; Exxon Chemical)

EBA: ethylene-butyl acrylate copolymer containing 72–68% ethylene and 28–32% butyl acrylate (Lotryl 3610; Atochem)

EMAAA: ethylene-methyl acrylate - acrylic acid terpolymer containing 75% ethylene, 20% methyl acrylate and 5% acrylic acid (ATX 325; Exxon Chemical)

EMAAAZn: zinc ionomer (Iotek 7510; Exxon Chemical)

ACM1: acrylic rubbers containing vinyl chloroacetate cure sites (Hytemp 4051; Nippon Zeon)

ACM2: acrylic rubbers containing vinyl chloroacetate cure sites (Hytemp 4051EP; Nippon Zeon)

ACM™3: acrylic rubber containing vinyl chloroacetate cure sites (Nipol AR 71; Zeon Chemical)

ACM™4: acrylic rubber containing vinyl chloroacetate cure sites (Hytemp 4052EP; Zeon Chemical)

ACM™5: acrylic rubber containing vinyl chloroacetate cure sites (Hytemp 4053EP; Zeon Chemical)

ACM™6: acrylic rubber containing vinyl chloroacetate cure sites (Nipol AR 72LF; Zeon Chemical)

ACM™7: acrylic rubber containing vinyl chloroacetate cure sites (Nipol AR 72 LS; Zeon Chemical)

c) Curable rubbers:

EAR1: ethylene methyl acrylate terpolymer containing about 50% ethylene, about 49% methyl acrylate and about 1% monomer containing acid cure site (Vamac G; DUPONT)

EAR2: ethylene-methylacrylate terpolymer containing about 74% methylacrylate, 25% ethylene and about 1% of a monomer containing an acid cure site (Vamac LS; DUPONT)

d) Compatibilizers:

PP-Ma: polypropylene grafted with about 0.15% by weight of maleic anhydride (Exxelor P01015; Exxon Chemical)

PP-NHR: (Experimental Grade; Exxon Chemical)

EBAMa: ethylene acrylic ester maleic anhydride terpolymer containing about 68% ethylene and about 32% comonomer (Lotader 3700; Atochem)

EEAMa: ethylene acrylic ester maleic anhydride terpolymer containing about 68% ethylene and about 32% comonomer (Lotader 4700; Atochem)

EGMA1: ethylene glycidyl methacrylate copolymer about 90% ethylene, about 10% glycidyl methacrylate (Igetabond E; Sumitomo)

EGMA2: ethylene glycidyl methacrylate copolymer about 95% ethylene, about 5% glycidyl methacrylate (Igetabond C; Sumitomo)

EEAGMA: terpolymer containing ethylene, acrylic ester and glycidyl methacrylate about 67% ethylene, about 33% comonomer (Lotader Ax 8660, Attochem)

e) Curatives:

| NPC-50:  | quarternary ammonium salt | (Nippon Zeon) |
|----------|---------------------------|---------------|
| K St:    | potassium stearate        | (Witco)       |
| Diak #1: | hexamethylenediamine carbamate | (DUPONT) |
| "ph ACM": | weight parts per hundred weight parts of acrylate rubber | |
| "ph EAR": | weight parts per hundred weight parts of ethylene acrylic rubber | |

General procedure used to prepare cured rubber concentrates

The polymers are mixed together in a preheated Brabender internal mixer (60 g) or prep center (300 g) equipped with cam blades. Mixer speed is maintained at 100 or 120 rpm during the whole mixing. The polymers are mixed until the melt temperatures reaches 12° C. The crosslinking agent is added and mixing continued 3 minutes after the maximum in torque has been reached. Some compositions have also been prepared in a 3.7 1 Farrel internal mixer. Blade speed was 100 RPM and the machine was not preheated. Compositions are given in Table 1.

TABLE 1

| CRC | 1 | 2 | 3 | 4 | 5 | 6 | 7 | 8 | 9 | 10 | 11 |
|---|---|---|---|---|---|---|---|---|---|---|---|
| Composition | | | | | | | | | | | |
| EMA | 30 | | | | | | 25 | 30 | 30 | 30 | 25 |
| EBA | | 30 | | | 30 | 30 | | | | | |
| EMAAA | | | 30 | | | | | | | | |
| EMAMZn | | | | 30 | | | | | | | |
| EAR1 | 70 | 70 | 70 | 70 | 70 | 70 | | 70 | 70 | 70 | 75 |
| EAR2 | | | | | | | 75 | | | | |
| Diak #1 (ph EAR) | 1 | 1 | 1 | 1 | 2 | 1.5 | 1 | 1.25 | 1.5 | 2.5 | 1.25 |
| Mixing Equipment | | | | | | | | | | | |
| Brabender mixer | | X | X | X | X | X | | | | | |
| Prep Center | X | | | | | | | | | | |
| Farrel | | | | | | | X | X | X | X | X |

| CRC | 12 | 13 | 14 | 15 | 16 | 17 | 18 |
|---|---|---|---|---|---|---|---|
| Composition | | | | | | | |
| EMA | 30 | | | | | | |
| ACM1 | | 50 | | 50 | 50 | 50 | |
| ACM2 | | | 50 | | | | |
| EMA20 | | | | | | | 30 |
| | | | | 50 | 50 | 70 | |
| EAR1 | | | | | | | |
| EAR2 | 70 | 50 | 50 | 50 | | | |
| Diak #1 (ph EAR) | 2.5 | 1 | 1 | 1.25 | | 1 | 2.5 |
| NPC-50 | | | | | 2 | | |
| K St | | | | | 4 | | |
| Mixing Equipment | | | | | | | |
| Farrel | X | X | X | X | X | X | X |

| CRC | 19 | 20 | 21 | 22 | 23 |
|---|---|---|---|---|---|
| EAR#1 | 50 | 50 | 50 | 50 | 50 |
| ACM#3 | 50 | | | | |
| ACM#4 | | 50 | | | |
| ACM#5 | | | 50 | | |
| ACM#6 | | | | 50 | |
| ACM#7 | | | | | 50 |
| Diak#1 (phEAR) | 1 | 1 | 1 | 1 | 1 |

3. General procedure for the preparation of blends

The engineering thermoplastic, the CRC and optionally the compatibilizer are mixed together in a Brabender mixer at a temperature 20° to 30° C. above the melting or glass transition temperature of the plastic phase at 120 RPM during 5 minutes. They are removed from the mixer and cooled to room temperature. They are afterwards compression moulded at a temperature 40° to 50° C. above the melting or glass transition temperature of the plastic phase during 3 minutes under 10 tonnes pressure into 3 mm plaques from which specimens are cut for testing.

4. Examples

Example I

A comparison has been made between the properties of a material prepared by melt mixing PBT/CRC1 or PA6™1/CRC1 and mixing the raw material before adding the curatives.

These data show significant improvement in elongation at break and oil swell for both plastic and tensile strength at break for the PA6™1 containing material.

TABLE 2

| | 1 | C1 | 2 | C2 |
|---|---|---|---|---|
| Polymers | | | | |
| PBT | 30 | 30 | | |
| PA6#1 | | | 30 | 30 |
| CRC1 | 70 | | 70 | |
| EMA | | 21 | | 21 |
| EAR1 | | 49 | | 49 |
| Diak #1 (phEAR) | | 2.5 | | 2.5 |
| Properties | | | | |
| Hardness (5 sec. Shore A) | 76 | 77 | 93 | 74 |
| Tensile Strength at Break (MPa) | 5.8 | 5.9 | 13.1 | 10.0 |
| Modulus 100% (MPa) | 3.3 | 4.6 | 9.1 | 6.0 |
| Elongation at Break (%) | 255 | 184 | 271 | 197 |
| ASTM #3 Oil Swell (125° C./70 h) (%) | 35 | 45 | 13 | 40 |

Example II

In these examples are given compositions where the carrier is an ethylene terpolymer with a functional group which does not react with the curatives. Higher elongation at break and tensile strength at break are obtained when a zinc ionomer (EMAAAZn) is used because it has a greater affinity with the PA6™2 than the two other ones. It is also shown that the ratio carrier/curable rubber as well as the level of curatives used can be modified without affecting significantly the properties of the DVAs.

TABLE 3

|  | 3 | 4 | 5 | 6 | 7 |
|---|---|---|---|---|---|
| Polymers |  |  |  |  |  |
| PA6 2 | 30 | 30 | 30 | 30 | 30 |
| CRC2 | 70 |  |  |  |  |
| CRC3 |  | 70 |  |  |  |
| CRC4 |  |  | 70 |  |  |
| CRC5 |  |  |  | 70 |  |
| CRC6 |  |  |  |  | 70 |
| Properties |  |  |  |  |  |
| Hardness (5 sec. Shore A) | 86 | 87 | 88 | 86 | 84 |
| Tensile Strength at Break (MPa) | 14.6 | 13.5 | 15.3 | 10.3 | 10.6 |
| Modulus 100% (MPa) | 9.8 | 8.3 | 10.1 | 7.2 | 7.3 |
| Elongation at Break (%) | 225 | 241 | 300 | 200 | 200 |
| ASTM #3 Oil Swell (125° C./70 h) (%) | 30 | 55 | 46 | 28 | 36 |

The following Table 4 demonstrates the influence of PBT engineering resin on the thermoplastic elastomer of the present invention. Table 5 shows the influence of compatibilizers on the properties of thermoplastic elastomers of the invention comprising PBT. In relation to the examples shown in Table 5 a blend was prepared comprising 20 weight parts PBT, 56 weight parts EAR, 24 weight parts EMA and 1 weight part of DIAK™1 which yielded a powder upon processing.

TABLE 4

|  | 8 | 9 | 10 |
|---|---|---|---|
| Polymers: |  |  |  |
| PBT | 20 | 15 | 10 |
| CRC10 | 80 | 85 | 90 |
| Properties: |  |  |  |
| Hardness (5 sec. Shore A) | 69 | 63 | 59 |
| Tensile Strength at Break (MPa) | 5.7 | 6.1 | 6.3 |
| 100% Modulus (MPa) | 3.5 | 2.7 | 2 |
| Elongation at Break (%) | 192 | 222 | 271 |
| Compression Set (150° C./70 h) (%) | 56 | 42 | 37 |
| Compression Set (PC) (150° C./70 h) (%) | 62 | 46 | 43 |
| ASTM#3 Oil Swell (125° C./70 h) (%) | 22 | 24 | 25 |

TABLE 5

|  | 11 | 12 | 13 | 14 | 15 | 16 | 17 |
|---|---|---|---|---|---|---|---|
| Polymers: |  |  |  |  |  |  |  |
| PBT | 20 | 20 | 20 | 20 | 20 | 20 | 20 |
| CRC18 | 80 | 79 | 78 | 75 | 79 | 78 | 75 |
| EEAGMA |  | 1 | 2 | 5 |  |  |  |
| EMAAAZn |  |  |  |  | 1 | 2 | 5 |
| Properties: |  |  |  |  |  |  |  |
| Hardness (5 sec. Shore A) | 78 | 78 | 80 | 77 | 75 | 74 | 75 |
| Tensile Strength at Break (MPa) | 4.9 | 6 | 6.2 | 5.6 | 4.7 | 4.1 | 4 |
| 100% Modules (MPa) | 4.5 | 4.7 | 4.7 | 4 | 3.8 | 3.5 | 3.4 |
| Elongation at Break (%) | 136 | 167 | 177 | 220 | 158 | 180 | 213 |
| ASTM#3 Oil Swell (125° C./70 h) (%) | 19 | 17 | 17 | 30 | 17 | 17 | 17 |

Example III

In these Examples a blend of PA6™3 or PBT and CRC7 are blended together with a compatibilizer. Depending on the type of compatibilizer, higher elongation and/or tensile strength at break or softer material are obtained which shows the possibility to tailor make a material according to specific requirements.

TABLE 6

|  | 18 | 19 | 20 | 21 | 22 | 23 |
|---|---|---|---|---|---|---|
| Polymers |  |  |  |  |  |  |
| PA6#3 | 25 | 25 | 25 | 25 | 25 | 25 |
| CRC7 | 75 | 70 | 70 | 70 | 70 | 70 |
| PP-Ma |  | 5 |  |  |  |  |
| EMAAAZn |  |  | 5 |  |  |  |
| EMAAA |  |  |  | 5 |  |  |
| EMAMa1 |  |  |  |  | 5 |  |
| EKAMa2 |  |  |  |  |  | 5 |

TABLE 6-continued

|  | 18 | 19 | 20 | 21 | 22 | 23 |
|---|---|---|---|---|---|---|
| Properties |  |  |  |  |  |  |
| Hardness (5 sec. Shore A) | 86 | 88 | 82 | 78 | 76 | 73 |
| Tensile Strength at Break (MPa) | 8.5 | 8.8 | 9.2 | 7.0 | 7.6 | 6.2 |
| Mod,l,s 100% (MPa) | 6.7 | 6.8 | 5.7 | 4.4 | 4.6 | 3.8 |
| Elongation at Break (%) | 217 | 217 | 263 | 232 | 304 | 288 |
| ASTM #3 Oil Swell (125° C./70 h) | 18 | 19 | 21 | 21 | 24 | 24 |

TABLE 7

|  | 24 | 25 | 26 | 27 | 28 | 29 | 30 |
|---|---|---|---|---|---|---|---|
| Polymers: |  |  |  |  |  |  |  |
| PBT | 30 | 25 | 25 | 25 | 25 | 25 | 25 |
| CRC7 | 70 | 70 | 70 | 70 | 70 | 70 | 75 |
| PP-NH2 |  | 5 |  |  |  |  |  |
| EGMA1 |  |  | 5 |  |  |  |  |
| EGMA2 |  |  |  | 5 |  |  |  |
| EEAGMA |  |  |  |  | 5 |  |  |
| EMAAAZN |  |  |  |  |  | 5 |  |
| Properties |  |  |  |  |  |  |  |
| Hardness (5 sec. Shore A) | 76 | 75 | 79 | 74 | 82 | 67 | 65 |
| Tensile Strength at Break (MPa) | 5.1 | 4.8 | 9.7 | 6.7 | 8.0 | 4.8 | 4.2 |
| Modulus 100% (MPa) | 3.9 | 3.4 | 5.5 | 3.9 | 5.4 | 3.0 | 2.5 |
| Elongation at Break (%) | 288 | 350 | 304 | 309 | 247 | 310 | 304 |
| ASTM #3 Oil Swell (125° C./70 h) (%) | 24 | 26 | 71 | 41 | 57 | 25 | 27 |

Example IV

This example serves to illustrate compositions where the ratio plastic/CRC. is changing and allows the fabricability of very soft compositions. It is also interesting to note that, at low plastic CRC ratios, there is no more need to post cure the material to improve the compression set. The results are shown in Table 8 and Table 9.

TABLE 8

|  | 31 | 32 | 33 | 34 | 35 | 36 | 37 | 38 |
|---|---|---|---|---|---|---|---|---|
| Polymers |  |  |  |  |  |  |  |  |
| PA6#3 | 30 | 25 | 20 | 15 | 30 | 25 | 20 | 15 |
| CRC8 | 70 | 75 | 80 | 85 |  |  |  |  |
| CRC9 |  |  |  |  | 70 | 75 | 80 | 85 |
| Properties |  |  |  |  |  |  |  |  |
| Hardness (5 sec. Shore A) | 89 | 78 | 70 | 58 | 87 | 79 | 68 | 65 |
| Tensile Strength at Break (MPa) | 9.2 | 8.0 | 6.3 | 5.7 | 10.2 | 7.3 | 6.0 | 5.6 |
| Modules 100% (MPa) | 7.7 | 5.3 | 3.4 | 2.1 | 7.9 | 5.1 | 3.7 | 3.1 |
| Elongation at Break (%) | 161 | 210 | 145 | 325 | 170 | 190 | 193 | 195 |
| Compression Set (150° C./70 h) (%) | 98 | 86 | 57 | 45 | 87 | 70 | 52 | 41 |
| Compression Set (150° C./70 h)(PC)(%) | 76 | 62 | 45 | 39 | 68 | 53 | 39 | 37 |
| ASTM #3 Oil Swell (125°/70 h) (%) | 25 | 29 | 32 | 41 | 22 | 26 | 34 | 36 |

TABLE 9

|  | 39 | 40 | 41 | 42 | 43 | 44 | 45 | 46 |
|---|---|---|---|---|---|---|---|---|
| Polymers |  |  |  |  |  |  |  |  |
| PA6#3 | 30 | 25 | 20 | 15 | 30 | 25 | 20 | 15 |
| CRC10 | 70 | 75 | 80 | 85 |  |  |  |  |
| CRC11 |  |  |  |  | 70 | 75 | 80 | 85 |

TABLE 9-continued

|  | 39 | 40 | 41 | 42 | 43 | 44 | 45 | 46 |
|---|---|---|---|---|---|---|---|---|
| Properties | | | | | | | | |
| Hardness (5 sec. Shore A) | 83 | 76 | 70 | 63 | 89 | 79 | 67 | 58 |
| Tensile Strength at Break (MPa) | 7.6 | 7.2 | 7.0 | 6.3 | 8.6 | 7.7 | 6.3 | 5.7 |
| Modules 100% (MPa) | 7.0 | 5.6 | 4.4 | 2.8 | 8.0 | 5.1 | 3.3 | 2.1 |
| Elongation at Break (%) | 123 | 155 | 172 | 205 | 125 | 208 | 255 | 331 |
| Compression Set (150° C./70 h) (%) | 75 | 59 | 39 | 32 | 93 | 76 | 63 | 38 |
| Compression Set (150° C./70 h)(PC)(%) | 52 | 43 | 37 | 31 | 73 | 63 | 45 | 36 |
| ASTM #3 Oil Swell (125° C./70 h) (%) | 24 | 27 | 33 | 38 | 27 | 28 | 34 | 41 |

Example V

Evaluation of Polyamide 6,6

This example shows compositions where a higher melting point engineering resin is used as plastic phase. This can be done quite easily with a CRC because no crosslinking reactions are take place during the second step so that no special attention has to be taken regarding the kinetic of curing of the rubber (faster at higher temperature). This also demonstrates the flexibility of using a two steps process in the selection of the engineering resin. Also of interest, the compression sets of the compositions are the same after post curing than before which indicates that the crosslinking reaction goes to 100% at high temperatures and that, consequently, no post curing is required. The results are shown in Table 10.

TABLE 10

|  | 47 | 48 | 49 | 50 |
|---|---|---|---|---|
| Polymers | | | | |
| PA6,6#1 | 20 | 15 | | |
| PA6,6#2 | | | 20 | 15 |
| CRC12 | 80 | 85 | 80 | 85 |
| Properties | | | | |
| Hardness (5 sec. Shore A) | 71 | 63 | 72 | 64 |
| Tensile Strength at Break (MPa) | 5.4 | 5.4 | 5.6 | 6.0 |
| Modulus 100% (MPa) | 4.0 | 2.9 | 4.5 | 2.9 |
| Elongation at Break (%) | 171 | 215 | 141 | 219 |
| Compression Set (150° C./70 h)(%) | 44 | 35 | 48 | 36 |
| Compression Set (150° C./70 h)(PC) (%) | 44 | 37 | 49 | 40 |
| ASTM #3 Oil Swell (125° C./70 h)(%) | 19 | 21 | 19 | 21 |

Example VI

Evaluation of CRC where the carrier can be crosslinked during the second step

This example shows compositions where the EMA (which can be defined as an "inert" carrier) is replaced by a carrier which contains functional groups. These functional groups do not react with those of the rubber nor with the curatives because their reactivity is orders of magnitude slower so that the majority of the curatives react with the rubber first and do produce a material which can be later on processed. This "active" carrier can be crosslinked while mixing with the engineering resin during the second step.

The comparative compositions shown in the following Table 11 give worse mechanical properties than those described in the present invention or do not result in a material which can later on be processed.

TABLE 11

|  | C3 | 51 | C4 | 52 |
|---|---|---|---|---|
| Polymers | | | | |
| PA6#3 | 30 | 30 | | |
| PA6#1 | | | 30 | 30 |
| ACM1 | 35 | | | |
| ACM2 | | | 35 | |
| EAR2 | 35 | | 35 | |
| CRC13 | | 70 | | |
| CRC14 | | | | 70 |
| Diak #1 (phEAR) | 1 | | 1 | |
| NPC-50 (phACM) | 2 | 2 | 2 | 2 |
| K St (phACM) | 4 | 4 | 4 | 4 |
| Properties | | | P | |
| Hardness (5 sec. Shore A) | 86 | 93 | O | 92 |
| Tensile Strength at Break (MPa) | 15.4 | 18.6 | W | 16.2 |
| Modulus 100% (MPa) | 8.8 | 10.9 | D | 10.6 |
| Elongation at Break (%) | 232 | 290 | E | 256 |
| ASTM #3 Oil Swell (125° C./70 h)(%) | 14 | 10 | R | 11 |

The examples given in the following compositions of Table 12 show that it is possible to reduce the plastic to CRC ratio without negatively affecting the processability. They also show that any type of polyamide 6 can be used which gives a lot of flexibility to control the viscosity and design compositions for extrusion, injection or blow moulding.

TABLE 12

|  | 53 | 54 | 55 | 56 | 57 |
|---|---|---|---|---|---|
| Composition | | | | | |
| PA6#3 | 25 | 20 | 15 | | |
| PA6#5 | | | | 20 | |
| PA6#6 | | | | | 20 |
| CRC15 | 75 | 80 | 85 | 80 | 80 |
| NPC-50 (phACM) | 2 | 2 | 2 | 2 | 2 |
| K St (phACM) | 4 | 4 | 4 | 4 | 4 |
| Properties | | | | | |
| Hardness (5 sec. Shore A) | 84 | 74 | 60 | 75 | 77 |
| 100% Modulus (MPa) | 6.1 | 4.7 | 3.3 | 5.1 | 5.5 |
| Tensile Strength at Break (MPa) | 16.2 | 13.0 | 9.0 | 10.7 | 12.9 |
| Elongation at Break (MPa) | 299 | 283 | 234 | 227 | 239 |
| ASTM #3 Swell (125° C./70 h) (%) | 11 | 14 | 16 | 13 | 12 |

The compositions of C5 and 58 in the following Table 13 are exactly the same. However, in C5, the ACM of the CRC is cured during the first step and the EAR during the second. It can be seen that the physical properties are not as good as according to the present invention because of the reaction of the curative (Diak ™1) with the plastic phase.

TABLE 13

|  | C5 | 58 |
|---|---|---|
| Polymers |  |  |
| PA6#1 | 30 | 30 |
| CRC15 | 70 | 70 |
| CRC16 |  |  |
| Diak #1 (phEAR) | 2.5 |  |
| NPC-50 (phACM) |  | 2 |
| K St (phACM) |  | 4 |
| Properties |  |  |
| Hardness (5 sec. Shore A) | 82 | 89 |
| Tensile Strength at Break (MPa) | 12.8 | 17.7 |
| Modulus 100% (MPa) | 8.1 | 8.8 |
| Elongation at Break (%) | 177 | 295 |
| ASTM #3 Oil Swell (70° C./168 h) (%) | 9 | 3 |

The following Table 14 demonstrates the influence of the molecular weight of polyamide upon the properties of the thermoplastic elastomer. Table 15 demonstrates the influence of different CRC's upon PA6™3.

TABLE 14

|  | 59 | 60 | 61 | 62 |
|---|---|---|---|---|
| Polymers: |  |  |  |  |
| PA6#5 | 20 |  |  |  |
| PA6#3 |  | 20 |  |  |
| PA6#1 |  |  | 20 |  |
| PA6#6 |  |  |  | 20 |
| CRC15 | 80 | 80 | 80 | 80 |
| NPC-50 (phACH) | 2 | 2 | 2 | 2 |
| K St (phACM) | 4 | 4 | 4 | 4 |
| Properties: |  |  |  |  |
| Hardness (5 sec. Shore A) | 75 | 74 | 75 | 69 |
| Tensile Strength at Break (MPa) | 10.7 | 13.0 | 12.1 | 8.5 |
| Modulus 100% (MPa) | 5.1 | 4.7 | 4.9 | 4.1 |
| Elongation at Break (%) | 227 | 283 | 246 | 233 |
| Compression Set (150° C./70 h) (%) | 78 | 77 | 83 | 68 |
| Compression Set (150° C./70 h) (PC) (%) | 62 | 61 | 65 | 58 |
| ASTM #3 Oil Swell (125° C./70 h) (%) | 13 | 14 | 13 | 14 |

TABLE 15

|  | 63 | 64 | 65 | 66 | 67 |
|---|---|---|---|---|---|
| Polymers: |  |  |  |  |  |
| PA6#3 | 20 | 20 | 20 | 20 | 20 |
| CRC#19 | 80 |  |  |  |  |
| CRC#20 |  | 80 |  |  |  |
| CRC#21 |  |  | 80 |  |  |
| CRC#22 |  |  |  | 80 |  |
| CRC#23 |  |  |  |  | 80 |
| NPC-50 (phACM) | 2 | 2 | 2 | 2 | 2 |
| K St (phACM) | 4 | 4 | 4 | 4 | 4 |
| Properties: |  |  |  |  |  |
| Hardness (5 sec. Shore A) | 73 | 76 | 73 | 74 | 75 |
| Tensile Strength at Break (MPa) | 9.5 | 9.3 | 8.7 | 8.6 | 9.2 |
| Modulus 100% (MPa) | 4.1 | 4.9 | 4.2 | 4.9 | 5.6 |
| Elongation at Break (%) | 255 | 217 | 241 | 222 | 189 |
| Compression Set (150° C./70 h) (PC) (%) | 67 | 64 | 68 | 69 | 86 |
| ASTM #3 Oil Swell (150° C./70 h) (%) | 29 | 29 | 31 | 31 | 30 |

I claim:

1. A thermoplastic elastomeric composition comprising a blend of:
   (a) about 10 to about 40 parts by weight of an engineering thermoplastic resin and
   (b) about 90 to about 60 parts by weight of a cured rubber concentrate consisting essentially of cured rubber and a carrier, which has been previously obtained by mixing
      (i) about 10 to about 90% by weight, based on the weight of (i) plus (ii), of a curable elastomeric copolymer (rubber);
      (ii) about 90 to about 10% by weight, based on the weight of (i) plus (ii), of a polymeric carrier which is not miscible with the curable elastomeric copolymer as assessed by the presence of two different glass transition temperatures in the blend of (i) and (ii) and which carrier does not react with the curative used to vulcanize (i);
      (iii) about 0.1 to about 5 parts by weight, based on 100 parts by weight of (i) plus (ii) of a curing agent (curative) for the curable elastomeric copolymer; and
      (iv) optionally additives, under conditions of heat and shear in a melt mix at least until the maximum torque has been reached,
   and
   (c) up to about 10 parts by weight of a compatibilizer.

2. The composition of claim 1 wherein the blend comprises
   (a) about 15 to about 35 parts by weight of the engineering thermoplastic resin and
   (b) about 85 to about 65 parts by weight of the cured rubber concentrate (b).

3. The composition of claim 1 wherein the engineering thermoplastic resin (a) is selected from polyamides, polyesters, polyimides, polyphenylene sulfide, polyphenylene sulfone, fluorinated polymers, styrene acrylonitrile copolymers, styrene maleic anhydride copolymer, polyphenylene ether and its blends with polystyrene, polycarbonates and blends thereof.

4. The composition of claim 1 wherein the curable elastomeric copolymer is selected from olefin/acrylic ester polymer rubber, olefin/acrylic ester/unsaturated carboxylic acid rubber terpolymers, acrylic rubber, nitrile rubber, hydrogenated nitrile rubber, silicone rubber, fluoroelastomer, ethylene propylene diene rubber, styrene-butadiene rubber, epichlorohydrin rubber and mixtures thereof.

5. The composition of claim 1 wherein the carrier is selected from thermoplastic polymers or copolymers, elastomers or thermoplastic elastomers which may contain reactive groups which do not react with the curatives used for the curable rubber nor with the functional groups of the curable rubber.

6. The composition of claim 1 wherein the engineering resin is a polyamide, the cured rubber concentrate is based on a cured ethylene/acrylate/acrylic acid terpolymer and the carrier is ethylene methylacrylate.

7. A method for the preparation of the thermoplastic elastomeric composition of claim 1 comprising blending
   (a) about 90 to about 60 parts by weight of a cured rubber concentrate consisting essentially of cured rubber and a carrier, which has been previously obtained by mixing
      (i) about 10 to about 90% by weight, based on the weight of (i) plus (ii), of a curable elastomeric copolymer (rubber);
      (ii) about 90 to about 10% by weight, based on the weight of (i) plus (ii), of a polymeric carrier which is not miscible with the curable elastomeric copolymer as assessed by the presence of two different glass transition temperatures in the blend of (i) and (ii) and which carrier does not react with the curative used to vulcanize (i);

(iii) about 0.1 to about 5 parts by weight, based on 100 parts by weight of (i) plus (ii) of a curing agent (curative) for the curable elastomeric copolymer; and (iv) optionally additives, under conditions of heat and shear in a melt mix at least until the maximum torque has been reached, with (b) about 10 to about 40 parts by weight of an engineering thermoplastic resin, and (c) up to about 10 parts by weight of a compatibilizer under conditions of shear at a temperature which is 20° to 30° C. above the melting temperature or glass transition temperature of the thermoplastic resin.

8. The method of claim 7 wherein the blend comprises (a) about 15 to about 35 parts by weight of the engineering thermoplastic resin and (b) about 85 to about 65 parts by weight of the cured rubber concentrate.

9. The method of claim 7 including the additional step of curing the carrier in the blend of (a), (b) and (c) with a curing agent suitable for curing the carrier, which curing agent is different from the curative (ii) used for the elastomeric copolymer.

* * * * *